United States Patent

[11] 3,547,291

| [72] | Inventors | Elmo L. Batterton;<br>Melvin J. Lonsdale, Morton, Ill. |
|---|---|---|
| [21] | Appl. No. | 768,399 |
| [22] | Filed | Oct. 17, 1968 |
| [45] | Patented | Dec. 15, 1970 |
| [73] | Assignee | Meyer Morton Co.<br>Morton, Ill.<br>a corporation of Illinois |

[54] TRANSPORT AND ERECTION TRAILER
6 Claims, 8 Drawing Figs.

| [52] | U.S. Cl. | 214/515,<br>214/501 |
|---|---|---|
| [51] | Int. Cl. | B60p 1/64 |
| [50] | Field of Search | 214/500,<br>501, 505, 506, 515, 3 |

[56] References Cited
UNITED STATES PATENTS

| 2,606,673 | 8/1952 | Young | 214/38(22) |
|---|---|---|---|
| 3,155,248 | 11/1964 | Haller | 214/501X |
| 3,160,289 | 12/1964 | Leefer | 214/3X |
| 3,251,497 | 5/1966 | Simas | 214/515 |

FOREIGN PATENTS

| 1,136,218 | 9/1962 | Germany | 214/501 |
|---|---|---|---|

*Primary Examiner*—Albert J. Makay
*Attorney*—Hill, Sherman, Meroni, Gross & Simpson

ABSTRACT: A transport and erection trailer to be towed by a truck or tractor and designed to carry a structure normally too large to be taken down a highway and passed beneath low overhead structures such as viaducts and bridges by means of transporting vehicles heretofore known, the trailer being arranged to carry such structure in a substantially horizontal position and when the destination is reached raise it to a vertical position upon a preformed foundation ready for usage.

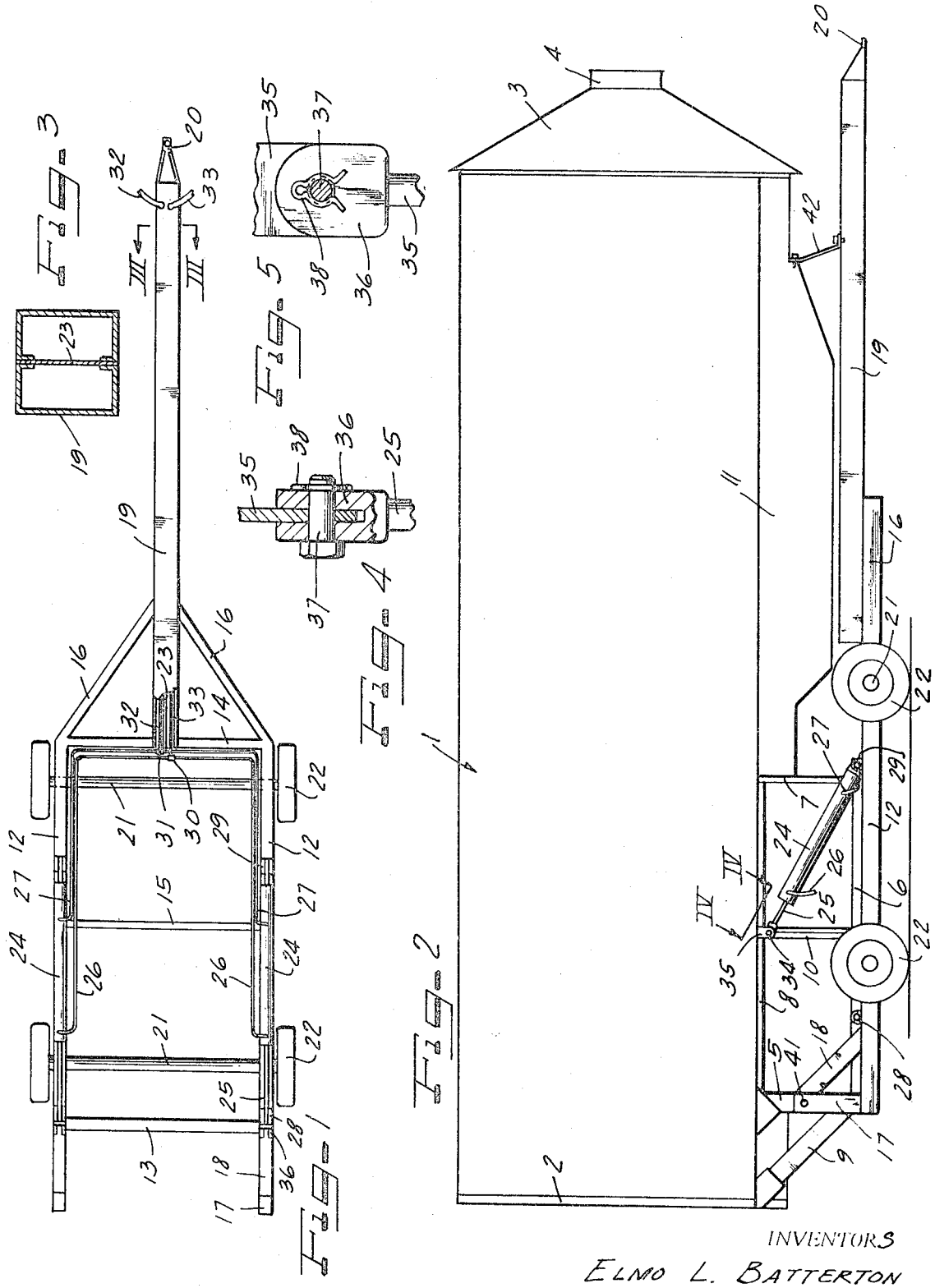

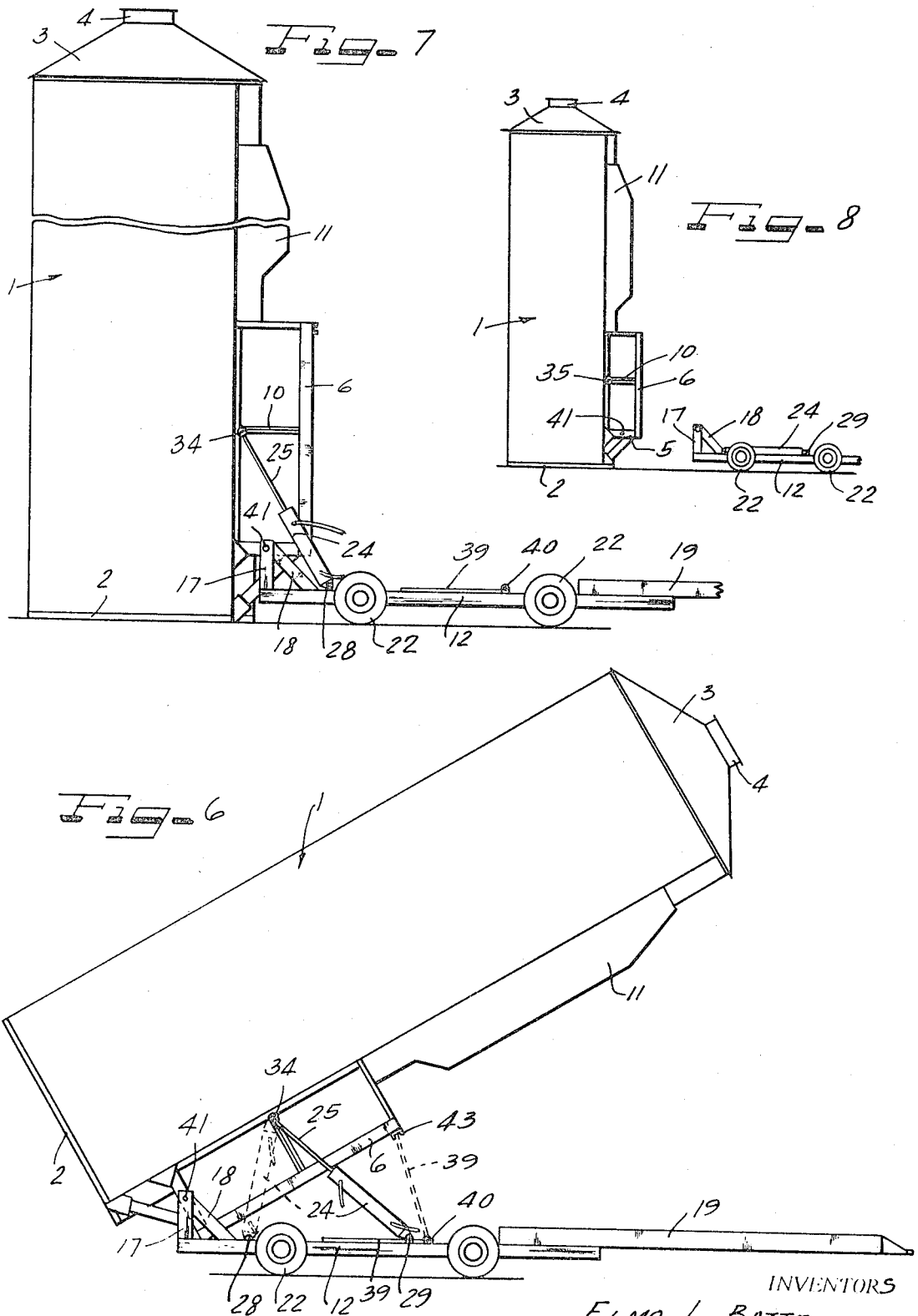

TRANSPORT AND ERECTION TRAILER

SUMMARY OF THE INVENTION

Heretofore, various types of large structures had to be assembled at the point of usage owing to the impossibility of transporting a complete structure. This was particularly true in regard to farm equipment such as corncribs, silos, grain dryers, etc., such structure frequently being 35 to 40 feet in height and having a diameter or cross measurement of 8 to 12 feet or more. The assemblage or partial assemblage of such a structure in a relatively remote farm location is an objectionably expensive and laborious task particularly because of the frequent lack of sufficient power and manufacturing facilities, whereby the cost of the completed structure is considerably increased.

The instant invention effectively overcomes the problems and disadvantages mentioned above in the provision of a trailer to be towed by truck or tractor an and which is so designed as to transport a fully assembled structure such as a large grain dryer, silo, or a structure of similar size and shape over ordinary highways, country roads, and similar paths of travel. The trailer has an underslung chassis with a tongue projecting forwardly therefrom and is equipped with means for elevating the structure from a horizontal to a vertical position and at the same time seating the structure in upright position on a previously formed foundation. Stabilizing means are also provided to maintain the structure in a fixed position on the trailer during transportation.

Other advantages of the trailer include its economy in construction and usage. The trailer is generally in the form of a skeleton frame mounted on wheels, and the elevating means are disposed on each side of such frame and may be folded down into an out-of-the-way position when the trailer is not in use. Power to actuate the lifting means may be carried by the truck or tractor towing the trailer or disposed upon the ground adjacent the trailer, if so desired. Because of a trailer of this type, the structure to be transported may be completely assembled in the manufacturing plant where adequate power and all manufacturing facilities are readily available. Other advantages will be apparent from the following description.

BRIEF DESCRIPTION OF THE DRAWINGS

FIG. 1 is a fragmentary plan view, with portions broken away to show parts therebeneath, of a trailer embodying principles of the instant invention;

FIG. 2 is a side elevational view of the trailer of FIG. 1 with a structure to be transported in loaded position thereon;

FIG. 3 is a transverse vertical sectional view, enlarged, taken substantially as indicated by the line III–III of FIG. 1;

FIG. 4 is an enlarged fragmentary vertical sectional view, with parts shown in elevation, taken substantially as indicated by the line IV–IV of FIG. 2, illustrating a suitable connection between the elevating means and structure being transported;

FIG. 5 is a fragmentary side view of the structure of FIG. 4 taken from the right-hand side of FIG. 4;

FIG. 6 is a side elevational view illustrating the elevation of the structure carried by the trailer from horizontal to vertical position;

FIG. 7 is a fragmentary side elevational view showing the seating of the transported structure in a vertical position off the trailer; and FIG. 8 shows the transported structure mounted in vertical position for use, with the trailer separated therefrom.

DESCRIPTION OF THE PREFERRED EMBODIMENT

By way of example and not by way of limitation, the trailer embodying the instant invention is shown in connection with the transportation of a grain dryer of the type set forth and claimed in our copending application entitled Continuous Flow Grain Dryer Ser. No. 653,174 filed July 13, 1967, now U.S. Pat. No. 3,440,734. The details of that dryer are not herein shown, but only the general outline. This dryer, generally indicated by numeral 1 is substantially cylindrical with the exception of a housing projecting from one side of the dryer in the lower portion thereof, the frame of the housing only being herein shown, the outer sheathing having been removed for clarity in showing connections to the trailer. The dryer has a base 2, a conical cover 3 over the upper end thereof through which grain may be delivered into the dryer through a central opening defined by neck 4. The grain is delivered to the opening by a suitable vertical conveyor which may be mounted on the side of the dryer adjacent the housing frame and which is not shown herein. The housing frame is rectangular in cross section as well as in vertical section, both sides being identically constructed and there being suitable crosspieces between them. This frame on each side includes an outwardly extending base member 5, an upright member 6, a top outwardly extending member 7 and an inside upright member 8. From the base of the dryer body an obliquely extending support 9 engages the outer end of the base member 5 at its junction with the outside upstanding member 6. A central partition 10 separates the housing frame into upper and lower compartments for hot and cool air blowers respectively. Above the housing frame is an outstanding stack 11 in which hot air is conveyed to the interior of the dryer.

The trailer embodies a skeleton frame comprising opposed side rails 12–12, a rear cross rail 13, a forward crossrail 14, a center cross rail 15 and a pair of converging members 16–16 extending forwardly from the forward crossrail 14, as best seen in FIG. 1. An upstanding structure is provided on the rear end of each side rail 12 consisting of a vertical member 17 and an obliquely disposed bracing member 18, for pivotal supporting connection with the housing frame on the dryer as will later appear. All of the foregoing frame members may be welded or equivalently secured together at junction points.

Extending forwardly from the trailer frame is an elongated tongue 19 having a hitch connection 20 at its forward end. This tongue overlies the juncture between the converging frame members 16–16 and extends over the frame member 14, being welded or equivalently secured to these frame members.

Extending through the side rails 12–12 is a pair of spaced axles 21–21 each of which carries a wheel 22 on each end thereof, the wheels being disposed outside the side rails. Preferably these wheels are rubber tired and of relatively small diameter in comparison with commonly known automobile wheels so as to maintain a low height for the trailer and its load.

For lightness in weight and adequate strength for supporting a load, the tongue 19 and all the aforesaid frame members are preferably made in box form as seen in FIG. 3 and provided with an upstanding central partition 23.

Lifting means are provided on the trailer, and in the illustrated instance these lifting means are in the form of a known type of double acting hydraulic ram or jack comprising a cylinder 24 which contains a piston with the piston rod 25 extending without the cylinder. The piston may be forcibly moved in either direction, by way of hydraulic pressure lines 26 and 27 entering the cylinder at opposite ends thereof. There is one such jack associated with each side rail 12–12 of the frame and the closed end of th the jack cylinder 24 may be selectively pivoted to the respective frame member at either of two pivot points 28 and 29. The hydraulic lines 26 and 27 from each jack follow a parallel course along the respective side rail 12, turn in front along the cross frame member 14 and terminate in a tee 30 for the lines 26, and a tee 31 for the lines 27 which tees join with master lines 32 and 33 passing through the tongue 19, one on either side of the center partition 23 and emanate from the tongue through suitable apertures in the top thereof near the hitch connection 20 as seen best in FIG. 1. From this point two master lines may be connected to suitable hydraulic power and control mechanism, not shown, but which may conveniently be carried on the vehicle towing the trailer. Passing the master lines through the tongue 19 and supporting the lines 26 and 27 in any suitable manner adjacent the frame keeps all of the lines free and clear from fouling during transit or use.

During travel and erection of the structure on the trailer, the head of the hydraulic jack piston is pivotally connected at the point 34 to a lug 35 depending from the rear upstanding member 8 of the housing frame on the dryer 1, on each side of the dryer. A satisfactory form of releasable pivot connection is illustrated in FIGS. 4 and 5. In this instance, the piston shaft of a jack is provided with a bifurcated head 36 which receives between the furcations thereof the lug 35, and these parts are apertured to accommodate a headed pivot bolt 37 maintained in place by a spring clip 38, cotter pin, or equivalently. A similar connection may be used at all pivot points 28, 29 and 34, although the bifurcated part may be either the lug attached to the frame or a part of the hydraulic jack.

When the trailer is not in use each hydraulic jack is pivoted at the point 29 and folded down on the respective side frame member 12 of the trailer. The head 36 of the piston rod 25 may be locked behind the other pivot lug secured to the respective frame member 12 at 28 so that each jack is maintained in a stable position and ready for immediate usage when the trailer is either in transit or garaged. Also, as seen in FIGS. 6 and 7 each side rail 12 is provided with a prop rod 39 pivoted to the respective rail 12 as at 40, these prop rods also remain folded down upon the respective frame members when the trailer is not in use, and these only come into usage during elevation of the trailer load.

When the trailer is to be put to use, the silo 1 or other load may be disposed on the trailer with the aid of a crane and with or without the aid of the hydraulic jacks 24–24 and disposed in an horizontal position on the trailer bed as seen in FIG. 2. When the silo, in this instance, is seated if the rams of the hydraulic jacks have not previously been connected to the silo at the pivot point 34, they now are for stabilizing the silo during travel. It will be noted that the lower crossmember 5 of the housing frame on the silo is apertured as well as the upstanding frame member 17 at the rear of each of the side members 12 of the trailer to establish a pivot point at 41 so as to connect this lower frame member to the upstanding frame portions 17—18 of the trailer, also preventing shifting of the silo relatively to the trailer during travel. Further stabilizing of the silo is accomplished by bolting or equivalently securing a brace rod 42 to both a portion of the silo and the tongue 19 of the trailer, near the forward end of the silo as seen in FIG. 2. Contemporaneously the main or master hydraulic lines 32 and 33 may be connected to hydraulic apparatus on the vehicle towing the trailer. With those connections made, the hydraulic jacks may be kept in relatively tight holding position on the dryer.

When the trailer and its load reach the desired destination, the trailer is backed into position along side a preformed foundation. The brace rod 42 is removed, and nothing else need be disconnected at this time. The hydraulic jacks are then actuated to elevate the dryer about the pivot point 41 to an angle between 30° and 40°, as seen in FIG. 6. At this time, each of the prop rods 39 are elevated and the free ends thereof inserted in socket lugs 43 secured to the housing frame on the silo adjacent the ultimately upper end of this frame as also shown by the dotted lines in FIG. 6. Then, the jack is disconnected from the frame at the pivot point 39, and the same end of the jack is then reconnected pivotally to the ta trailer frame at the pivot point 28, as also shown by dotted lines in FIG. 6. So positioning the jacks provides a more direct thrust upon the silo particularly since in the initial position of the jacks the result is in the piston rods pointing more toward the pivot point 41 than away from it, shortly after operation begins from the second position of the jacks, these rods are also pointing more toward that pivot point 41 than away from it, giving a more direct pushing force on the silo. After the change in position of the jacks, they are again actuated and the prop rods 39 folded down into their travel position. The jacks are actuated from that point on until the silo is moved into substantially vertical position and then the silo can be gently set up vertically upon the preformed foundation as indicated in FIG. 7. Following the positioning of the silo the trailer is disconnected from the silo at the pivot points 34 and 41, the hydraulic jacks folded down into travel position, and the trailer may be then drawn away as seen in FIG. 8. After this operation, it is a simple expedient to connect the various motors in the dryer to proper power sources, and provide conveying means leading to the inlet and outlet openings of the dryer from sources determined by the purchaser of the silo.

From the foregoing it will be noted that the simplicity and high efficiency of the trailer permits easy transportation and erection of a structure that can be fully assembled in a manufacturing plant prior to transportation. Such of course adds greatly to the economy of both making and delivering the structure. Further, the trailer itself is quite economical to manufacture, strong and durable.

It will be understood that modifications and variations may be effected without departing from the scope of the novel concepts of the present invention.

We claim:

1. A trailer operable on a highway for transporting a structure normally too large for highway transportation, said trailer having axles and wheels, and including:
   an underslung frame;
   a tongue connected to the forward portion of said frame;
   said frame and tongue being arranged to jointly support a structure in horizontal position for transportation, a pair of vertical upstanding supporting means fixed to and extending above the rear of said frame and arranged at the free ends for pivotal connection directly to means on the transported structure to stabilize the same during transportation; and
   elevating means carried by said frame arranged for pivotal connection directly to the transported structure and in cooperation with said supporting means to raise the transported structure from horizontal to vertical position and contemporaneously deposit the same off the trailer.

2. The trailer of claim 1, wherein said elevating means are selectively pivotally connectable to said frame at a plurality of points, and prop means on said frame to hold the transported structure in a partial degree of elevation to permit changing the pivotal connection of said elevating means with the frame to provide a more direct thrust upon the structure.

3. The trailer of claim 1, wherein said frame is a skeleton frame comprising: a pair of side rails; and a plurality of crossrails; and wherein said upstanding supporting means comprise: an upstanding sub-frame on the rear end of each of said side rails.

4. The trailer of claim 3, wherein said elevating means comprise: a hydraulic jack carried by each said side rail; spaced pivotal connections on each said side rail for selective pivotal connection to the cylinder of the respective jack; and means on the end of the piston rod of each said jack for pivotal connection with the transported structure.

5. The trailer of claim 4, including a prop pivotal at one end to each of said side rails to engage the transported structure and hold the same partially elevated while the pivotal connection between each side rail and the respective jack is changed.

6. The trailer of claim 4, including hydraulic pressure lines connected to said jacks and extending along said side rails and inwardly along the forward crossrail, a pair of master pressure lines connected at one end to the first said pressure lines and extending through said tongue for connection to hydraulic apparatus on the vehicle towing the trailer.